Sept. 26, 1961  L. F. SHIPLET  3,001,585
DEEP WELL CEMENTING APPARATUS
Filed Dec. 17, 1957
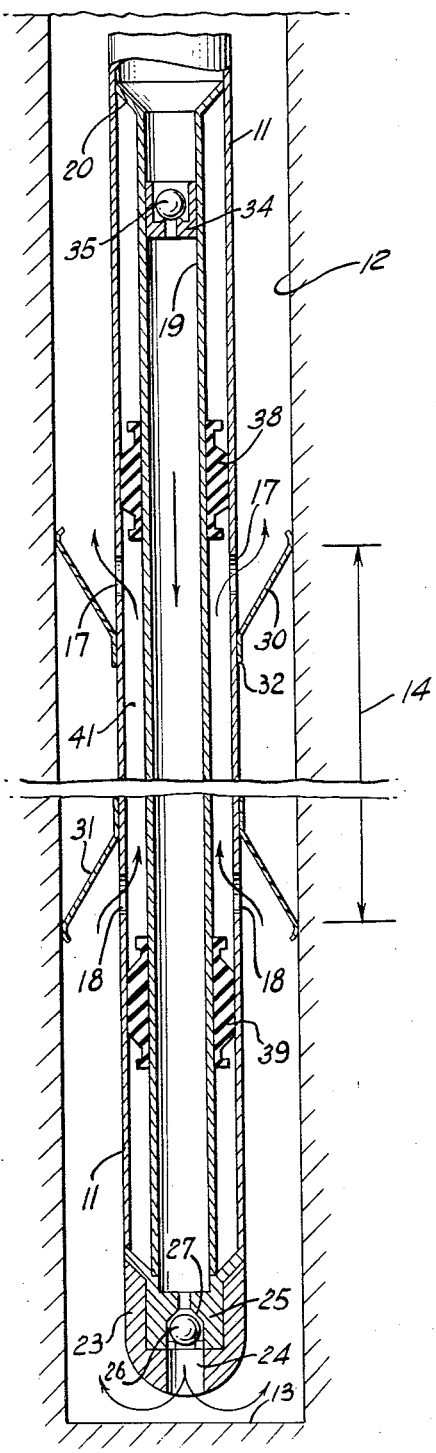

United States Patent Office 3,001,585
Patented Sept. 26, 1961

3,001,585
DEEP WELL CEMENTING APPARATUS
Levi F. Shiplet, Fort Worth, Tex., assignor to Texaco Inc., a corporation of Delaware
Filed Dec. 17, 1957, Ser. No. 703,371
2 Claims. (Cl. 166—142)

This invention is concerned with apparatus for cementing deep well casings. More specifically, the apparatus proivdes for a relatively simple arrangement to cement oil well or other deep well casings within the drilled hole; while providing an area of no cement at any given zone down the well. This may be accomplished while employing the usual simple operation of pumping a predetermined quantity of cement slurry down the casing and into the annular space between the casing and the walls of the hole.

Heretofore, various arrangements have been proposed for cementing casing in a deep well while preventing the cement from flowing around the casing at desired locations (such as producing zones in an oil well). All of these prior art methods and arrangements are relatively complicated and involve apparatus and/or procedures that are expensive and time consuming.

Consequently, it is an object of this invention to provide a relatively simple structural arrangement whereby casing may be cemented into a deep well in the ordinary simple manner of pumping cement slurry down the casing and then upward in the annular space between the casing and the walls of the well. This being accomplished with the ability to cause cement slurry to by-pass any given zone or zones where it is desirable to omit the cementing of the casing to the sidewalls of the well.

Briefly, this invention concerns deep well cementing apparatus for cementing casing in a well while omitting said cement from a predetermined zone along the length of said well. The invention includes the improvement which comprises, openings through the walls of the casing both above and below said predetermined zone. The apparatus includes sealing means located between the zone and each of the said openings, for closing the annular space between the outer walls of said casing and the walls of said well. The apparatus also includes a concentric tube within said casing extending from above the uppermost of said openings to the lower end of said casing. The apparatus also includes means for joining the upper end of said concentric tube with the inner walls of said casing to direct the flow of cement slurry through said concentric tube only, the latter being provided in order that cement slurry will flow down out near the bottom of said casing and then up around the casing and within it at said predetermined zone.

The above and other objects and benefits of the invention will be more fully appreciated in connection with a more detailed description, which follows, and which is illustrated in the drawing in which the figure illustrates a cross-section of a deep well showing the lower end of casing structure partially in cross section.

Referring to the figure of the drawing, it is pointed out that there is shown a casing 11 within a well 12 that has been drilled in the earth. The well 12 is bottomed at some predetermined depth as indicated by a well bottom 13 illustrated. There is indicated a predetermined zone 14 along the length of the well which may represent a producing zone.

It is desirable to omit the application of cement between the outside of the casing 11 and the walls of the hole at the zone 14. This may be accomplished by the relatively simple apparatus illustrated which includes a plurality of openings, or ports 17 located effectively above the zone 14 and a similar plurality of openings, or ports, 18 located effectively below the zone 14. In addition there is situated concentrically within the casing 11, a tube 19 which has a conical flared end 20 that joins the top end of the tube 19 with the inner walls of the casing 11. As indicated in the illustration, flared end 20 may be integrally formed from tube 19, if desired, while the wide part of the cone of end 20 may be press fitted within the casing 11. Of course, other structures could be employed, so long as a substantially fluid tight joinder is made between the walls of casing 11 and the top end of the tube 19.

The tube 19 extends from above the top of the uppermost zone 14 that is to be by-passed, to the bottom end of the casing 11. At the bottom of the casing 11, there is attached a float shoe 23 that has a central passageway 24 therethrough and that includes a float valve structure 25. Float valve 25 includes a ball 26 that acts in cooperation with a valve seat 27 to check any reverse flow of fluid upwardly through the passageway 24.

Attached to the outside of the casing 11 somewhat below the openings 17, there is illustrated schematically, a petal basket 30 which extends all the way around the periphery of the casing 11 and is fastened to the outer walls hereof in a fluid-tight manner, e.g. by welding 32, as illustrated. The leaves of the petal basket structure are hinged or sprung outward from, close to the casing 11, and the structure is such that there is a spring bias force tending to open the leaves of the basket 30, in order to apply some force against the walls of the well 12 at the free ends of the petals of basket 30.

Located above the openings 18 in casing 11 there is a similar petal basket 31 that is, however, attached in an inverted manner to the casing 11. This petal basket 31 will be provided with some arrangement (not shown) for holding the petals thereof in a collapsed position, close against the outer walls of casing 11, during the descent of the casing into the hole 12, e.g. see the U.S. patent to one Baker, No. 2,187,483, issued January 16, 1940.

It will be appreciated that other types of sealing means may be employed to close off the annular space between the outer walls of casing 11 and the inner walls of the well 12. One such other element would be an inflatable packer (not shown) which would replace the petal baskets illustrated in each case.

There is illustrated a different type of float valve 34, located near the top of the tube 19. Valve 34 is illustrated with a ball 35 in place in the valve. As will be pointed out below, the ball 35 is not in place, as shown in the drawing, until after the quantity of cement slurry has been pumped down through the top of tube 19. Thus it is the purpose of the ball 35 to cut off the entry of drilling mud or whatever fluid is being employed to follow the cement slurry down the casing.

It is pointed out that there may be employed a slip joint retainer 38 located surrounding the tube 19 and inside of the casing 11 in order to close off the annular space therebetween. This retainer 38 is located close to, but above the openings 17. Similarly, if desired, there may be employed another slip joint retainer 39 located below the openings 18.

Operation

The procedure for cementing casing in a well, in accordance with this invention, would be as follows. A predetermined quantity of cement slurry (not shown) is pumped down the casing 11 behind a wiping plug (not shown), in the usual manner that is well known for casing cementing operations. This quantity of cement slurry is followed by a so-called bump plug (not shown), but the bump plug is preceded by the ball 35 floated on top of the column of cement slurry; so that when the cement slurry has all passed through the upper float valve 34, ball 35 will cut off circulation and prevent encroachment of the drilling mud or other fluid which follows the column of cement slurry down the casing 11. An increase in pressure accompanies the meeting of the pump plug with the wiping plug, as well as the seating of ball 35 in valve 34. This indicates the fact that the cement slurry has reached its destination.

As the cement slurry proceeds down the casing it will flow through the tube 19 and out the bottom thereof through passage 24 into the bottom of the well 12. Then this slurry continues to flow upward around the casing 11 until it reaches the sealing means (in the form of inverted petal basket 31) where it is diverted and caused to flow through the openings 18, as indicated by the arrows. The slurry then continues to flow upward through an annular space 41 until it reaches the openings 17, when it flows out into the space around the casing 11 again. The cement is prevented from flowing downward at this point (to contact the producing zone 14) by the petal basket 30 that is located below the openings 17. Finally, the cement slurry continues to flow upward around he casing 11 and along the walls of the well 12 to the desired height that is to be cemented.

Then following the pumping in of the desired quantity of cement, and the allowing of sufficient time for this cement to set, the tube 19 and its accompanying structure may be drilled out readily to provide a clear and open casing 11.

After the above operation, the producing zone 14 may be tapped by perforating the casing 11, as desired.

It will be appreciated by anyone skilled in the art, that the invention may be applied to any number of zones such as zone 14 illustrated. This might be done using duplication of the structure illustrated and described for each zone, or by using the single central by-pass tube extending from above the uppermost zone 14. The latter including elements to cause the cement slurry to by-pass each zone in a manner like that described in connection with zone 14.

It is contemplated that the tube 19 will be constructed of a relatively soft material such as Dow metal or the like, so that after the cementing operation is completed the tube along with the annuli of cement therearound, may be drilled out without difficulty.

While a particular embodiment of the invention has been described in considerable detail in accordance with the applicable statutes, this is not to be taken as in any way limiting the invention but merely as being descriptive thereof.

I claim:

1. Simplified deep well casing cementing apparatus for cementing said casing in a well, but omitting the cement at a predetermined zone along the length of said well, comprising a plurality of openings through said casing above said zone, a plurality of openings through said casing below said zone, said casing being imperforate throughout the length of said zone, annular sealing means between the walls of said well and said casing and located axially between said zone and said openings thereabove, second annular sealing means between the walls of said well and said casing located axially between said zone and said openings therebelow, a single drillable material tube located concentrically within said casing and extending from above the uppermost of said openings to below the lowermost of said openings, means for connecting the top of said tube to the inner walls of said casing to direct cement slurry through said tube and a float valve located at the bottom of said tube for preventing reverse flow of cement upward through said tube.

2. Simplified deep well casing cementing apparatus according to claim 1 further including a valve seat located near the top of said tube for receiving a ball floated on said cement slurry.

References Cited in the file of this patent

UNITED STATES PATENTS

| | | |
|---|---|---|
| 1,910,442 | Manning | May 23, 1933 |
| 1,944,442 | Manning | Jan. 23, 1934 |
| 2,187,480 | Baker | Jan. 16, 1940 |
| 2,607,425 | Taylor | Aug. 19, 1952 |
| 2,765,854 | Lewis | Oct. 9, 1956 |
| 2,795,281 | Christian | June 11, 1957 |